Patented Feb. 6, 1923.

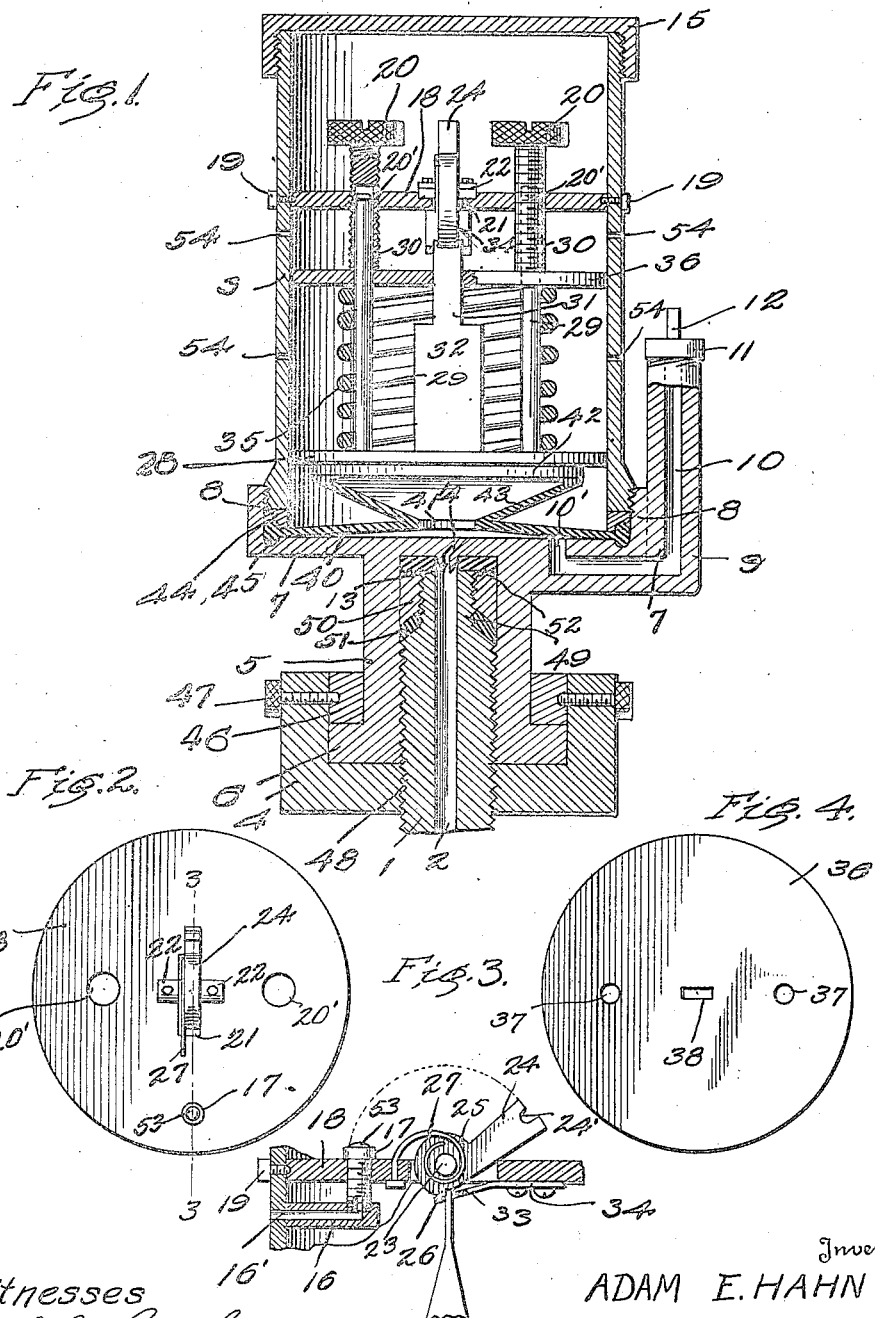

1,444,152

UNITED STATES PATENT OFFICE.

ADAM E. HAHN, OF SIOUX CITY, IOWA.

TIRE GAUGE.

Application filed April 12, 1920. Serial No. 373,349.

*To all whom it may concern:*

Be it known that I, ADAM E. HAHN, a citizen of the United States, residing at Sioux City, in the county of Woodbury and State of Iowa, have invented certain new and useful Improvements in Tire Gauges, of which the following is a specification.

This invention relates to pressure signals for automobile tires and has for its object the provision of means for preventing the damaging of a tire from which there has been a considerable loss of pressure due to slow leaks either through punctures or the tire valve and where such loss of pressure is ordinarily unknown to the driver of the car.

Another object is to provide a pressure gauge and signalling means whereby the driver of a car is promptly notified when the pressure in a tire has, for any reason, dimished to such a degree that it is both unsafe and unwise to continue further travel or use of such defective tire.

A further object of the invention is to provide a pressure gauge which can be adjusted to any desired pressure and so constructed as to be attached to and carried by the valve stem of a tire, even during the "pumping up" of a tire; air valve pipe means being provided on the pressure gauge for filling the tire without disturbing the connections between the tire valve stem and the gauge.

With these and other objects in view, my invention consists in the details of construction, arrangement and combination of parts as will be hereinafter fully described and pointed out in the accompanying drawings, in which Figure 1 is a vertical sectional view of the invention.

Figure 2 is a detailed view of the base plate and the signalling mechanism carried thereby.

Figure 3 is a section taken on the line 3—3 of Figure 2.

Figure 4 is a top plan view of the spring follower.

In the drawings, 1 indicates a valve stem of the usual construction, in the bore 2 of which is ordinarily located the valve mechanism by means of which air is admitted into or discharged from the tire. Such valve mechanism forms no part of my invention and has been excluded from the drawings as unnecessary to the description and illustration of my invention. It may be said that my improved pressure gauge embodies three principal sections; a pressure gauge casing 3, a locking nut 4 and the coupler or union 5.

The member 5 comprises a cylindrical portion adapted to be fitted over the valve stem 1 and provided with a flanged portion 6. The other end of the coupler carries an enlarged socket for the reception of the pressure gauge casing, this socket comprising the bottom wall 7 and an annular rim 8 threaded for engagement with the lower portion of the casing 3. A valve pipe 9 is formed integral with the tubular member 5 extending from one side thereof immediately below the bottom socket wall 7 and extends upwardly beyond the rim 8, being provided with an internal passage 10 leading up through the wall 8 as shown at 10'. A cap 11 provided with a finger grip 12 is adapted to be threaded over the outer end of the valve pipe for closing the passage. Depending into the bore of the coupler 5 from the under side of the wall 7 is a conical projection 13 provided with a central opening communicating with the off-set passage 14 of the socket wall.

The pressure gauge and signalling mechanism of the device is housed in the casing 3 which has one end threaded for engagement with a cap 15 and the other end threaded for engagement with the threads of the rim 8 of the coupler 5.

An exhaust nozzle 16 is welded or otherwise suitably affixed to the inner wall of the casing and is provided for threaded engagement with the lower end of the cap holder 17, an exhaust passage 16' being provided in the holder and nozzle and leading exteriorly of the casing. A supporting plate 18 is positioned within the casing by means of the set screws 19 so as to be slightly above the nozzle 16, and in supporting engagement with the cap holder 17, as shown to advantage in Figure 3 of the drawing. This plate is provided with threaded openings 20' through which are threaded adjusting screws 20. Fastened to the plate on opposite sides of a central opening 21 are sockets 22 in which are received the ends of a short axle 23 of a trip hammer 24. The trip hammer includes a cam head portion 25 through which the axle 23 is passed and the striking arm 24 which is provided with a notch 24' for receiving the tip of a finger to facilitate movement of the hammer to a set position. An abrupt shoulder 26 is formed on the cam portion 25 for a purpose hereinafter more fully explained.

A spring 27 is securely fastened to the plate 18 and is connected to the hammer being coiled about the axle 23 so as to normally tension the hammer to swing in the direction of the cap holder.

A piston head 28 is disposed for vertical movement within the casing and carries two upright spaced rods 29, the outer ends of which are adapted to be received within the tubular shank 30 of the adjusting screws 20. A trip lever 31 having a broad and substantial base 32 is rigidly mounted on the piston 28 between the spaced rods 29 and is adapted to work through the slotted end 33 of a flexible guide member 34, affixed to the under face of the plate 18 and projecting across the path of the trip lever. The coil spring 35 is disposed about the rods 29 with one end secured to the piston 28 and the opposite end secured to a follower 36. The follower 36 is adapted for movement independent of the piston and is provided with circular openings 37 through which the rods 29 pass and a rectangular opening 38 for the passage therethrough of the trip lever 31. The lower ends of the adjusting screws 20 bear down upon the follower and control movement of the follower for diminishing or increasing the expansion of the spring 35, thus permitting the spring to be tensioned in accordance with the amount of pressure desired to operate the device. Seated within the socket portion of the coupler 5 is a flexible diaphragm preferably of rubber and comprising an enlarged concaved base flange 40 provided with a central opening 41 and an air sack formed integral with the upper face of the base flange, such air sack comprising a rather wide upper portion 42 and a side wall 43, the side wall extending downwardly beneath the upper portion and converging inwardly toward the center opening 41 of the base flange, thus providing an expansible or collapsible diaphragm. A circular metallic washer 44 is adapted to be placed on top of the diaphragm base 40, before the casing 3 is screwed in place, suitable grooves being formed in the wall 7 and washer 44 to receive the enlarged rim 45 of the diaphragm base.

The locking nut 4 has its upper face provided with a recess, into which is inserted the base flange 6 of the coupler, a retaining ring or washer 46, held in place by set screws 47 being seated upon the flange 6 to retain the nut in engagement with the coupler. This washer 46 is adapted to move freely in a circle over said flange when the nut 5 is screwed onto the valve stem 1, thus permitting the nut to be turned without revolving the casing so that the latter is brought down upon the end of the valve stem in a vertical descension and without any lateral twist whatever. The ordinary tire valve stem 1 has two different sets of threads on it, one set of threads 48 being on the valve stem proper and the other threads on the part 49 of the stem to which a dust cap is ordinarily attached. In applying my invention onto the valve stem 1 to provide an air tight joint, the usual dust cap is replaced by a round nut 50 having its upper face provided with corrugations, concentrically disposed. This nut is screwed down until the top of the valve stem portion 49 and the corrugated face of the nut are on a horizontal plane, a circular washer 51 being interposed between the lower face of the nut and the shoulder of the valve stem. A rubber washer 52 having a corrugated under side complemental to the corrugated face of the nut is supported upon the top of the valve stem 1 and is provided with a central opening through which the conical projection 13 protrudes when the coupler 3 is drawn down upon the valve stem.

In setting forth the operation of the device, it must be assumed that the valve stem 1 has associated therewith some one of the usual forms of inlet valve mechanism by means of which the air is admitted into the tire. Assuming that such a mechanism is in the bore 2 of the valve stem here illustrated it will be seen that as the nut 5 is screwed about the valve stem, the coupler 5 will be drawn downwardly upon the stem until the projection 13 presses against the operating pin of the inlet valve mechanism so as to open the valve and keep it open as long as the device is attached to the valve stem, thus permitting the air to pass from the tire up through the passage 14 into the air sack of the diaphragm. The diaphragm thus expands, forcing the piston 29 upwardly against the tension of the spring 35 and causing the trip lever 31 to bear against the cam portion of the hammer. The hammer is then moved about its pivot, against the tension of the spring 27 until the cap shoulder 26 is engaged by the trip rod, preventing return of the hammer to its original position until removal of the trip rod. A suitable concussion cap 53 having been placed in the holder 17, the device is ready for operation. Upon any decrease in the pressure within the tire below that set for the operation of the device, the resistance of the pressure within the diaphragm against the tension of the spring 35 will be proportionately decreased, permitting the piston 28 to be forced by the spring against the diaphragm to such a degree, at least, that the trip lever 31 will be disengaged from the catch 26 of the hammer, which being free to move on its pivot will be swung against the concussion cap, exploding the same and causing a sharp report sufficient to attract the driver's attention and notify him of what has occurred. The passage 16' of the exhaust nozzle and the openings 54 in the wall of the casing provides an exhaust for the concussion, permitting the report to be heard clearly. In the preferred application of the invention, the air inlet valve mechanism previously referred to, is removed from the valve stem 1 and placed in the pipe 10 of the pressure gauge device so that it will not be necessary to take off the pressure gauge in order to fill the tire, the air supply pipe being attached directly to the pipe 10, in which instance the air will be admitted through the valve mechanism thereof into the passage 10 and through the opening 10' from which it passes under the base flange of the diaphragm into the air sack thereof and also through the passage 14 into the tire valve stem 1 and subsequently to the inner tube of the tire.

It will thus be seen that I have provided a pressure gauge signalling device which can be attached to the end of the ordinary tire valve stem in such a way as to have an absolutely air tight connection therewith, and at the same time permit of filling the tire without the necessity of disturbing the connection between the valve stem and the gauge.

Having thus fully described my invention, what I claim as new and desire to secure by Letters Patent is:—

1. A casing adapted to be attached to a tire valve and adapted to communicate therewith, a diaphragm in the casing actuated by the air pressure therein, a piston in the casing engageable with the diaphragm, a spring mounted on the piston, a follower engaged with the spring member, a signal actuated by the movement of the said piston and diaphragm, means for adjusting the relationship of the follower with the piston whereby the tension of the spring is regulated and the amount of air pressure to actuate the signal can be controlled.

2. A casing adapted to be attached to a tire valve and adapted to communicate therewith, a sound emitting passage associated with the casing, a detonating cap supporting tube communicating with the said sound emitting passage, a supporting plate mounted within the casing and adapted to receive the detonating cap supporting tube, and a cap exploding device mounted on the supporting plate and actuated by the variance of air pressure within the casing.

3. A casing adapted to be attached to a tire valve and adapted to communicate therewith, a diaphragm in the casing and actuated by the air pressure therein, a piston mounted in the casing and engageable with the diaphragm, a spring mounted on the piston, a follower engaged with the spring member, pins rising from the piston and extending through the follower, a supporting plate mounted within the casing, a signal actuated by the movement of the said piston and diaphragm, set screws threaded through the said supporting plate and having their shanks tubular to receive the upper ends of the pins carried by the piston for adjusting the relationship of the follower with the piston whereby the tension of the spring is regulated and the amount of air pressure to actuate the signal can be controlled.

In testimony whereof I affix my signature in presence of two witnesses.

ADAM E. HAHN.

Witnesses:
ALFRED F. HAHN,
ELLA KITSELMAN.